(12) United States Patent
Suyama et al.

(10) Patent No.: US 7,235,506 B2
(45) Date of Patent: Jun. 26, 2007

(54) SILICON CARBIDE MATRIX COMPOSITE MATERIAL, PROCESS FOR PRODUCING THE SAME AND PROCESS FOR PRODUCING PART OF SILICON CARBIDE MATRIX COMPOSITE MATERIAL

(75) Inventors: Shoko Suyama, Kawasaki (JP); Tsuneji Kameda, Tokyo (JP); Yoshiyasu Itoh, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/518,646

(22) PCT Filed: Jun. 18, 2003

(86) PCT No.: PCT/JP03/07700

§ 371 (c)(1),
(2), (4) Date: Dec. 20, 2004

(87) PCT Pub. No.: WO2004/007401

PCT Pub. Date: Jan. 22, 2004

(65) Prior Publication Data

US 2005/0255335 A1 Nov. 17, 2005

(30) Foreign Application Priority Data

Jun. 18, 2002 (JP) .............................. 2002-176680
Jun. 28, 2002 (JP) .............................. 2002-190588

(51) Int. Cl.
*C04B 35/565* (2006.01)
(52) U.S. Cl. ........................................ 501/88; 501/90
(58) Field of Classification Search .................. 501/88, 501/90
See application file for complete search history.

(56) References Cited

U.S. PATENT DOCUMENTS 4,019,913 A * 4/1977 Weaver et al. ............... 264/431
4,154,787 A * 5/1979 Brown ........................ 264/101
5,589,116 A * 12/1996 Kojima et al. .............. 264/628
6,228,293 B1 * 5/2001 Kriegsmann et al. ...... 264/29.7

(Continued)

FOREIGN PATENT DOCUMENTS

EP 0 798 280 10/1997

(Continued)

OTHER PUBLICATIONS

Kameda, Tsuneji et al. "Development of Continuous SiC Fiber-Reinforced Reaction Sintered SiC Matrix Composite", Journal of the Ceramic Society of Japan, vol. 107, No. 4, pp. 327-334, with English abstract, 1999.

*Primary Examiner*—Karl Group
(74) *Attorney, Agent, or Firm*—Oblon, Spivak, McClelland, Maier & Neustadt, P.C.

(57) ABSTRACT

Silicon carbide matrix composite material (1) comprises silicon carbide matrix (2) as a host. The silicon carbide matrix (2) comprises first silicon carbide phase (3) of 0.1 to 10 μm average crystal grain diameter and second silicon carbide phase (4) of 0.01 to 2 μm average crystal grain diameter. In interstices of silicon carbide crystal grains constituting the silicon carbide matrix (2), liberated silicon phase (5) amounting to, for example, 5 to 50 mass % based on the composite material (1) is present continuously in network form. This fine structure enables realizing high strength and high toughness of the silicon carbide composite material (1).

10 Claims, 4 Drawing Sheets

U.S. PATENT DOCUMENTS 6,695,984 B1 * 2/2004 Odaka et al. ............... 252/504

FOREIGN PATENT DOCUMENTS

| | | |
|---|---|---|
| JP | 55-3384 | 1/1980 |
| JP | 57-47772 | 3/1982 |
| JP | 02-061012 | 3/1990 |
| JP | 03-083870 | 1/1991 |
| JP | 06-199571 | 7/1994 |
| JP | 06-293575 | 10/1994 |
| JP | 08-012436 | 1/1996 |
| JP | 07-090418 | 4/1996 |
| JP | 08-151268 | 6/1996 |
| JP | 08-183661 | 7/1996 |
| JP | 08-188469 | 7/1996 |
| JP | 09-020572 | 1/1997 |
| JP | 10-167832 | 6/1998 |
| JP | 2001-019551 | 1/2001 |
| JP | 2002-037682 | 2/2002 |
| WO | 01/07377 | 2/2001 |

* cited by examiner

SILICON CARBIDE MATRIX COMPOSITE MATERIAL, PROCESS FOR PRODUCING THE SAME AND PROCESS FOR PRODUCING PART OF SILICON CARBIDE MATRIX COMPOSITE MATERIAL

TECHNICAL FIELD

The present invention relates to a silicon carbide matrix composite material of which mechanical properties such as strength and toughness are improved, a process for producing it, and a process for producing parts of the silicon carbide matrix composite material.

BACKGROUND ART

Silicon carbide (SiC) ceramics has excellent properties such as environment resistance, heat resistance, abrasion resistance, high rigidity, high heat conductance, low thermal expansion, and the like and, therefore, is used as a high-temperature structural member, an abrasion resistant member and the like. Especially, the properties of the SiC ceramics are utilized to practically use the SiC ceramics for jigs for semiconductor manufacturing devices and other semiconductor-associated parts in these years. Besides, it is also studied for application to industrial equipment such as nuclear, gas turbine and other energy equipment, pump parts, mechanical seal parts, sliding parts and the like.

As a process for producing the SiC ceramics, a reaction-sintering method is known other than a powder sintering method using the same sintering aids as used for an ordinary ceramics material. For example, the reaction-sintering method for SiC forms a mixture of SiC powder as an aggregate with carbon powder, a resin and the like into a desired shape, keeps heating the compact to the melting temperature or more of silicon and impregnates the molten silicon. The reaction sintering of SiC is a sintering method involving a reaction between carbon and silicon.

The reaction-sintering method for SiC has a lower sintering temperature than that of the powder sintering method and can provide a dense body without using sintering aids. The reaction-sintering method does not have a large shrinkage in size at sintering in comparison with the powder sintering method and can produce a large-size part and a complex shape part having a near net shape, providing an advantage capable of largely reducing the cost required for fabrication into the final shape. Thus, the reaction-sintering method is expected as a method which can produce SiC ceramics with a high purity at a low cost.

But, the SiC ceramics (reaction-sintered SiC) produced by the reaction-sintering method is generally known that it is poor in mechanical properties such as strength, fracture toughness values and the like in comparison with the SiC sintered body produced by the powder sintering method. Therefore, the reaction-sintered SiC is not applied to parts and devices which are required to have high strength at present.

Specifically, the reaction-sintered SiC contains a liberated silicon (Si) phase derived from its production method. Though the liberated Si phase contributes to make the reaction-sintered SiC dense, it is a cause of lowering the strength of the reaction-sintered SiC because it tends to become the starting point of fracture. A conventional reaction-sintered SiC has its strength or the like heavily degraded in comparison with the SiC sintered body produced by the powder sintering method because it is determined to have a large content of the liberated Si phase in order to enhance denseness, productivity and the like.

It is general for the conventional reaction sintering to use SiC powder having a relatively large grain diameter as an aggregate in order to improve the denseness, productivity and the like. However, the SiC ceramics produced by the conventional reaction-sintering method has a problem that the microstructure based on the aggregate SiC and reaction product SiC tends to become nonuniform because of the aggregate SiC having a relatively large grain diameter. The nonuniform microstructure becomes a cause of degrading the strength of the reaction-sintered SiC.

It is tried to reduce the amount of the liberated Si phase present in the reaction-sintered SiC against the above-described lowering of strength because of the liberated Si phase. But, simple reduction of the content of the liberated Si phase in the reaction-sintered SiC cuts the network structure of the liberated Si phase into pieces, resulting in producing a large volume of pores. Besides, microcracks are easily produced as the volume of the SiC produced by the reaction sintering expands. The pores and microcracks present in the reaction-sintered SiC cause lowering of the strength in the same manner as in the ordinary ceramics material.

Besides, Japanese Patent Laid-Open Application No. 2001-19551 describes a production method by which silicon is prevented from remaining by immersing a compact in a liquid silicon source (alkoxysilane or the like) and sintering at a temperature in a range of 1500 to 2000° C. But, the complete removal of the liberated Si phase tends to degrade the density because the liberated silicon phase contributes to making the reaction-sintered SiC dense. The strength of the reaction-sintered SiC has not been enhanced satisfactorily because the denseness is degraded. Sintering at a relatively high temperature impairs the advantage of the reaction-sintering method capable of sintering at a low temperature.

As described above, the conventional reaction-sintering method has not reached a level that a high-strength SiC ceramics is produced with a good reproducibility. A method of producing SiC parts by the reaction-sintering method has a small shrinkage in dimensions at the time of sintering and can reduce a cost required for fabricating to provide a final shape but its application to parts having a complex shape is not satisfactory. Specifically, the compact shape is limited, and the machining cost increases because the conventional reaction-sintering method causes a volume expansion when the liberated Si phase solidifies. Besides, there is a problem that cracks and the like are easily caused at the time of solidification.

In this connection, Japanese Patent Laid-Open Application No. HEI 8-183661 describes a production method by which a temperature range of ±10° C. of at least the melting point of silicon is cooled at a cooling rate of 12° C./hr in a cooling process after the impregnation of silicon. According to this reaction-sintered SiC production method, the occurrence of cracks is suppressed to some extent, but an essential subject of providing a high strength has not been improved.

The present invention provides a silicon carbide matrix composite material which can be applied to a variety of members and parts required to have a high strength by improving the mechanical properties such as strength, toughness and the like of the reaction-sintered SiC and enhancing reliability and durability, and a process for producing it. The present invention also provides a process for producing parts of a silicon carbide matrix composite material by which parts having a complex shape and a large size of the silicon carbide matrix composite material can be produced inexpensively with their strength and toughness improved.

SUMMARY OF THE INVENTION

A silicon carbide matrix composite material according to the present invention comprises a silicon carbide matrix which comprises a first silicon carbide phase having silicon carbide crystal grains with an average crystal grain diameter in a range of 0.1 to 10 μm and a second silicon carbide phase having silicon carbide crystal grains with an average crystal grain diameter in a range of 0.01 to 2 μm; and a silicon phase which is continuously present in network form in the interstices of the silicon carbide crystal grains constituting the silicon carbide matrix.

The silicon carbide matrix composite material of the present invention is a dense sintered body which has a liberated silicon phase continuously present in network form in the interstices of the silicon carbide crystal grains constituting the silicon carbide matrix. The silicon phase is contained in a range of, for example, 5 to 50 mass % in the composite material. The present invention controls the microstructure including the average crystal grain diameters of the first and second silicon carbide phases constituting the silicon carbide matrix, so that the mechanical properties such as strength and fracture toughness values of the silicon carbide matrix composite material can be improved substantially.

A process for producing a silicon carbide matrix composite material according to the present invention, comprises a step of press forming a mixed powder of silicon carbide powder having an average grain diameter in a range of 0.1 to 10 μm and carbon powder having an average grain diameter in a range of 0.005 to 1 μm into a compact having a desired shape; and a step of impregnating molten silicon into the compact while heating the compact to a temperature of the melting point or more of the silicon.

In the process for producing a silicon carbide matrix composite material according to the present invention, the silicon impregnation step forms a silicon carbide matrix which comprises a first silicon carbide phase formed of the silicon carbide powder and having silicon carbide crystal grains with an average crystal grain diameter in a range of 0.1 to 10 μm and a second silicon carbide phase formed by a reaction of the silicon carbide powder and the silicon and having silicon carbide crystal grains with an average crystal grain diameter in a range of 0.01 to 2 μm and also causes the silicon phase to continuously present in network form in interstices of the silicon carbide crystal grains constituting the silicon carbide matrix.

And, a first process for producing a part of a silicon carbide matrix composite material according to the present invention comprises a step of forming a mixed powder of silicon carbide powder having an average grain diameter in a range of 0.1 to 10 μm and carbon powder having an average grain diameter in a range of 0.005 to 1 μm into a compact having a desired shape; a step of producing a sintered body of the silicon carbide matrix composite material by heating the compact to a temperature of the melting point or more of silicon and also impregnating molten silicon into the compact; and a step of fabricating the surface of the sintered body to provide a part having the final size.

A second process for producing a part of a silicon carbide matrix composite material according to the present invention comprises a step of forming a mixed powder of silicon carbide powder having an average grain diameter in a range of 0.1 to 10 μm and carbon powder having an average grain diameter in a range of 0.005 to 1 μm into a preliminary compact having a size larger than the final size; a step of processing at least a part of the preliminary compact into a compact having a size smaller than that of the preliminary compact but larger than the final size; a step of producing a sintered body of the silicon carbide matrix composite material by heating the compact to a temperature of the melting point or more of silicon and also impregnating molten silicon into the compact; and a step of fabricating the surface of the sintered body to provide a part having the final size.

According to the first and second processes for producing the part of the silicon carbide matrix composite materials of the present invention, various parts having a complex shape and a large size can be produced inexpensively from the silicon carbide matrix composite material excelling in strength and toughness. Specifically, when the sintered body is produced from the compact according to the present invention, the shrinkage is very small, so that the cost required for the fabrication to provide the final size can be reduced substantially. Especially, the present invention can further reduce the machining cost of the parts having a complex shape and a large size because the microstructure of the silicon phase is controlled to suppress the expansion of the silicon phase at the time of solidification.

Besides, a third process for producing a part of a silicon carbide matrix composite material according to the present invention is, to produce a part of a silicon carbide matrix composite material by bonding plural part units formed of the silicon carbide matrix composite material, comprised of a step of forming a mixed powder of silicon carbide powder and carbon powder into a desired shape to produce plural compacts corresponding to the plural part units; a step of adhering the plural compacts by an organic adhesive; a step of impregnating molten silicon into the plural compacts including the bonded portion by the organic adhesive, reaction sintering the plural compacts integrally to provide the plural part units and integrally bonding the plural part units by the reaction produced silicon carbide and the silicon present in network form.

A fourth process for producing a part of a silicon carbide matrix composite material according to the present invention is, to produce a part of a silicon carbide matrix composite material by bonding plural part units formed of the silicon carbide matrix composite material, comprised of a step of removing silicon which is present on the bonding surfaces of the plural part units formed of the silicon carbide matrix composite material; a step of adhering the bonding surfaces of the plural part units by an organic adhesive; and a step of impregnating molten silicon into the bonded portion by the organic adhesive and integrally bonding the plural part units by the reaction produced silicon carbide and the silicon present in network form.

According to the third and fourth processes for producing a part of the silicon carbide matrix composite material according to the present invention, the plural part units of the silicon carbide matrix composite material are integrally bonded by the reaction-sintered bonding layer based on the reaction of the organic adhesive layer used for adhesion of the compact and the sintered body and the molten silicon. Specifically, the plural part units formed of the silicon carbide matrix composite material are integrally bonded by the reaction produced silicon carbide and the silicon present in network form among its crystal grains. This reaction-sintered bonding layer allows the adhesion of the plural part units with high strength to produce parts having a more complex shape and a large size efficiently at a low cost.

BEST MODE FOR CARRYING OUT THE INVENTION

Embodiments of the present invention will be described below with reference to the following Examples.

Figure 1:
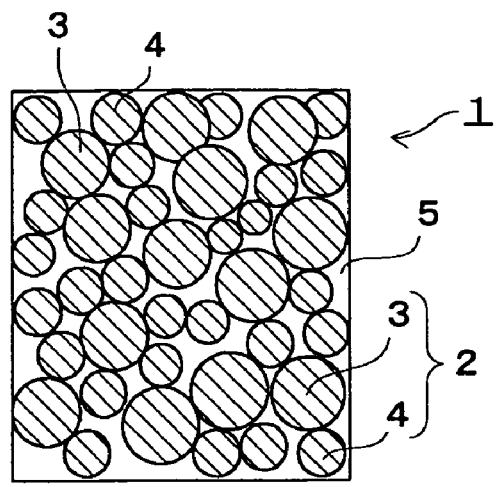
FIG. 1 is an enlarged sectional view schematically showing the microstructure of the silicon carbide matrix composite material according to one embodiment of the present invention.

FIG. 1 is an enlarged sectional view schematically showing the microstructure of the silicon carbide (SiC) matrix composite material according to one embodiment of the present invention. The SiC matrix composite material 1 shown in FIG. 1 has an SiC matrix 2 as its parent body. The SiC crystal grains constituting the SiC matrix 2 have, for example, two crystal grain diameter distributions. Specifically, the SiC matrix 2 is mainly comprised of a first SiC phase 3 having a relatively large average crystal grain diameter and a second SiC phase 4 having a relatively small average crystal grain diameter.

In the interstices of the SiC crystal grains constituting the SiC matrix 2, a liberated silicon (Si) phase 5 is present continuously in network form. The liberated Si phase 5 provides the SiC matrix composite material 1 with a dense sintered body. It is desirable that the SiC matrix composite material 1 has a porosity of, for example, 4% or less. If the porosity exceeds 4%, the SiC matrix composite material 1 is degraded in strength or the like. Besides, it is desired that the SiC matrix composite material 1 is substantially free from a pore. According to the present invention, the content of the liberated Si phase 3 is reduced, and the SiC matrix sintered body, which is substantially free from an open pore, can be obtained. It contributes greatly to improvement in strength of the SiC matrix composite material 1.

The first SiC phase 3 among the SiC phases constituting the SiC matrix 2 is formed of, for example, an SiC powder blended as an aggregate, and substantially no growth of a crystal is observed in the production process. Meanwhile, the second SiC phase 4 is produced by a reaction between, for example, a carbon powder and molten Si in a starting material. The second SiC phase 4 based on the reaction product SiC starts to grow from the vicinity of the surface of the first SiC phase 3 and is present in the SiC matrix composite material 1 in a state that the first SiC phase 3 is mutually sintered.

The strength of the SiC matrix composite material 1 can be improved by controlling the average crystal grain diameters of the first and second SiC phases 3, 4 to a prescribed range. Specifically, the SiC crystal grains constituting the first SiC phase 3 are controlled to have an average crystal grain diameter falling in a range of 0.1 to 10 μm. Meanwhile, the SiC crystal grains constituting the second SiC phase 4 are controlled to have an average crystal grain diameter falling in a range of 0.01 to 2 μm. It is assumed that the average crystal grain diameters of the first and second SiC phases 3, 4 have a value determined by mirror-polishing a desired cross-sectional surface of the SiC matrix composite material 1, observing the texture through an optical microscope (metallurgical microscope) or an electron microscope and conducting an image processing on the enlarged texture photograph.

If the first SiC phase 3 has an average crystal grain diameter of exceeding 10 μm, the mechanical properties such as strength and toughness cannot be expressed satisfactorily. It is considered that, if the average crystal grain diameter of the first SiC phase 3 is excessively large, the bonded structure by the second SiC phase 4 becomes non-uniform and the liberated Si phase 5 which becomes the starting point of fracture comes to have a large size, so that it tends to become a defect and has a bonding strength with the first SiC phase 3 lowered.

And, if the first SiC phase 3 has an average crystal grain diameter of less than 0.1 μm, a homogeneous composite texture is hardly obtained in view of productivity. Thus, a defect such as a hole is easily produced. The first SiC phase 3 is desirably controlled to have an average crystal grain diameter in a range of 0.1 to 5 μm in view of a balance with the average crystal grain diameter of the second SiC phase 4 and more desirably controlled to fall in the range of 0.2 to 5 μm.

If the second SiC phase 4 has an average crystal grain diameter of exceeding 2 μm, it becomes difficult to obtain a homogeneous composite texture due to volume expansion at the time of reaction sintering, and the liberated Si phase 5 tends to have a nonuniformly distributed state. If the second SiC phase 4 has an average crystal grain diameter of less than 0.01 μm, it becomes difficult to obtain a homogeneous composite texture in view of productivity, and the bonded structure with the first SiC phase 3 becomes insufficient. Consequently, the strength of the SiC matrix composite material 1 is degraded. The second SiC phase 4 is more desirably controlled to have an average crystal grain diameter falling in a range of 0.02 to 1 μm.

The SiC matrix composite material 1 of the present invention has a feature that the SiC matrix 2 is provided with the first and second SiC phases 3, 4 having the above-described average crystal grain diameters. Therefore, it includes a case that the average crystal grain diameter of the first SiC phase 3 based on the aggregate SiC is smaller than that of the second SiC phase 4 based on the reaction product SiC or a case that the first SiC phase 3 and the second SiC phase 4 have substantially the same average crystal grain diameter. But, when the average crystal grain diameter of the first SiC phase 3 is larger than that of the second SiC phase 4 as described above, a better strength improving effect can be obtained with a good reproducibility.

The crystal phase of the first SiC phase 3 consists of an α phase or a β phase. It is because either of the α phase and the β phase can be used for silicon carbide to be blended as an aggregate. The first SiC phase 3 may be either of the α phase and the β phase. Meanwhile, the second SiC phase 4 is produced by a reaction between a carbon powder and molten Si. Such a reaction product SiC becomes the β phase. The reaction product SiC having the β phase as the crystal phase has a high bonding strength with the first SiC phase 3 and contributes to the formation of a homogeneous SiC matrix sintered body having fewer pores. The crystal phase of SiC crystal grains can be identified by X-ray diffractometry in a microarea.

The liberated Si phase 5 which is present in the interstices of the SiC crystal grains constituting the SiC matrix 2 as described above has a continuous network structure. When the network structure of the liberated Si phase 5 is cut into pieces, formation of pores or the like is caused, and the strength of the SiC matrix composite material 1 is degraded. The content of the liberated Si phase 5 is generally determined to fall in a range of 5 to 50 mass %. The SiC matrix composite material 1 of the present invention can keep the network structure by the liberated Si phase 5 in a relatively small amount. It means that the liberated Si phase 5 which becomes a starting point of the fracture is decreased, the distribution width of the size of the liberated Si phase 5 is reduced, and the size of a defect is reduced. Therefore, it is desired that the content of the liberated Si phase 5 is in a range of 5 to 30 mass %.

If the content of the liberated Si phase 5 in the SiC matrix composite material 1 exceeds 50 mass %, a possibility that satisfactory mechanical properties cannot be obtained with a good reproducibility increases. In view of this, the content of the liberated Si phase 5 is preferably determined to be 50 mass % or less. Besides, the content of the liberated Si phase 5 is more preferably determined to be 30 mass % or less in order to improve the mechanical properties of the SiC matrix composite material 1 more stably. Conversely, if the content of the liberated Si phase 5 is less than 5 mass %, the network structure tends to be cut into pieces. It is assumed that the content of the liberated Si phase 5 is calculated on the basis of the theoretical density of Si and SiC from the result of image processing of a texture examination photograph and the sintered body density.

The mechanical properties of the SiC matrix composite material 1 can be improved furthermore by controlling not only the content of the liberated Si phase 5 but also its microstructure. Specifically, it is preferable that the liberated Si phase 5 has an average diameter in a range of 0.03 to 3 μm. The average diameter of the liberated Si phase 5 corresponds to an average distance between the SiC crystal grains. The small average diameter of the liberated Si phase 5 means that the liberated Si phase 5, which might be a starting point of fracture, is miniaturized. It also means that the SiC crystal grains are uniformly dispersed in the liberated Si phase 5 which forms a network.

Therefore, when the average diameter of the liberated Si phase 5 is controlled to 3 μm or less, the SiC matrix composite material 1 having high strength and high toughness can be obtained stably. Specifically, the SiC matrix composite material 1 can have a bending strength of 500 MPa or more with a good reproducibility. Meanwhile, if the liberated Si phase 5 has an average diameter of less than 0.03 μm, it is difficult to keep the network structure, a defect such as a hole tends to occur, and the mechanical properties tend to have variations. It is more preferable that the liberated Si phase 5 has an average diameter falling in a range of 0.03 to 2 μm.

Besides, it is preferable to control the microstructure of the liberated Si phase 5, so that an intergranular area between the SiC crystal grains (including the first and second SiC phases 3, 4) constituting the SiC matrix 2 and the liberated Si phase 5 is in a range of 0.1 to 10 $m^2/g$. A large intergranular area means that the liberated Si phase 5 is present in minute form and homogeneously in the interstices of the SiC crystal grains and the interstices of the SiC crystal grains are thoroughly filled. Therefore, the control of the intergranular area to 0.1 $m^2/g$ or more makes it possible to obtain the SiC matrix composite material 1 which stably shows high strength and high toughness.

But, the intergranular area of exceeding 10 $m^2/g$ means that the liberated Si phase 5 is excessively miniaturized. Therefore, the network structure of the liberated Si phase 5 tends to become discontinuous and a defect such as a hole tends to occur, and the strength of the SiC matrix composite material 1 tends to decrease. It is more preferable that the intergranular area of the SiC crystal grains and the liberated Si phase 5 constituting the SiC matrix 2 is controlled to a range of 0.1 to 6 $m^2/g$.

Here, the average diameter and intergranular area of the liberated Si phase 5 have the values determined as follows. Specifically, first, the SiC matrix composite material 1 is heated to 1600° C. under reduced pressure, and the liberated Si present in the SiC matrix composite material 1 is removed. It is assumed that the average diameter of the liberated Si phase 5 indicates an average value of diameters determined assuming that the diameter of a small pore formed by removing the liberated Si is a cylinder by using mercury porosimetry. It is assumed that the intergranular area indicates a value obtained by measuring a specific surface of a small pore, which is formed by removing the liberated Si, by using the mercury porosimetry.

As described above, the SiC matrix composite material 1 of this embodiment has superior strength, fracture toughness values and the like because the average crystal grain diameters of the first and second SiC phases 3, 4 constituting the SiC matrix 2 are controlled and the microstructure including the shape and the like of the liberated Si phase 4 is controlled. The SiC matrix composite material 1 has typical mechanical properties, such as a bending strength of 500 MPa or more and a fracture toughness value of 3 $MPa/m^{1/2}$ or more. Thus, the SiC matrix sintered body obtained by the reaction sintering can be made to have high strength and a high toughness according to the present invention. Therefore, the SiC matrix composite material 1 obtained by a low-cost reaction sintering can be applied to various types of members and parts which are demanded to have high strength.

The SiC matrix composite material (SiC matrix reaction-sintered body) 1 of the present invention can be used suitably for various types of equipment parts and equipment members such as jigs for semiconductor manufacturing devices, semiconductor-associated parts (heatsink, dummy wafer, etc.), high-temperature structural members for gas turbines, aerospace and aeronautical structural members, mechanical seal members, brake members, sliding parts, mirror parts, pump parts, heat exchanger parts, chemical plant component parts and the like. Especially, the SiC matrix composite material 1 can be applied to equipment parts and members which are required to have high strength, because it has high strength and high toughness. It largely contributes to the expansion of fields to which the inexpensive SiC matrix reaction-sintered body is applied.

For example, the above-described SiC matrix composite material (SiC matrix reaction-sintered body) 1 is produced as follows. Here, a process of producing parts (composite material parts) formed of the SiC matrix composite material 1 will also be described.

First, SiC powder and carbon powder are mixed at a prescribed ratio. The SiC powder as a starting material preferably has an average grain diameter in a range of 0.1 to 10 μm. As described above, SiC as an aggregate hardly grows grains, so that it is desirable that the SiC powder has an average grain diameter in a range of 0.1 to 10 μm, preferably 0.1 to 5 μm, in order to control the average crystal grain diameter of the first SiC phase 3 to a prescribed range. The crystal phase of the SiC powder may be either the α phase or the β phase.

Meanwhile, the carbon powder desirably has an average grain diameter in a range of 0.005 to 1 μm. The carbon powder reacts with molten Si to produce SiC. To realize a dense and homogeneous microstructure of the reaction product SiC (second SiC phase 4), the carbon powder desirably has an average grain diameter in a range of 0.005 to 1 μm, and more preferably a range of 0.01 to 0.5 μm.

The compounding ratio of the SiC powder and the carbon powder is preferably in a range of 10:1 to 10 (=10:1 to 10:10) in terms of a mass ratio. If the amount ratio of the carbon powder is smaller than the above range, the produced amount of the reaction product SiC is insufficient, and the SiC matrix composite material 1 might have a degraded strength. Meanwhile, if the amount ratio of the carbon powder is too much, the volume expansion amount at the reaction sintering becomes large, causing to easily produce microcracks locally. In this case, the strength might also be degraded. The compounding ratio of the SiC powder and the carbon powder is more preferably in a range of 10:3 to 5 (10:3 to 10:5) in terms of a mass ratio. The application of this compounding ratio enables to obtain a material which stably provides high strength and high toughness up to large shapes.

Besides, the compounding ratio of the SiC powder and the carbon powder has an effect on the control of the microstructure including the shape and the like of the liberated Si phase 5. The application of the above-described compounding ratio (especially, 10:3 to 5) facilitates the control the average diameter of the liberated Si phase 5 and the intergranular area with the SiC crystal grains into the range as described above. The shape and the like of the liberated Si phase 5 are affected by the density (a powder filling property, filled state and the like) of a compact and the average crystal grain diameter of the SiC phase as described later. An appropriate amount of a known organic binder may be added to a mixed powder as required.

Then, the mixed powder of the SiC powder and the carbon powder is pressed into a compact having a desired shape. As a press forming method, powder press forming, pressure casting, or the like can be applied. Where the powder press forming is applied, a pressure is preferably in a range of 0.5 to 2 MPa. For the powder press forming, die pressing, rubber pressing, cold isotropic pressing or the like is applied. Where the pressure casting is applied, it is desirable that the mixed powder is dispersed into water or an organic-based solvent to produce slurry, and the slurry is cast under a pressure of 0.5 to 10 MPa.

Figure 2:
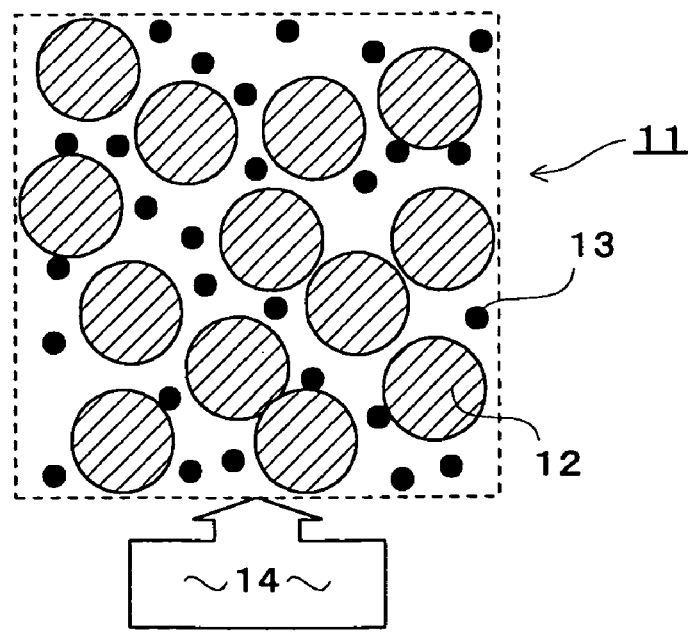
FIG. 2 is an enlarged sectional view schematically showing the production process of the silicon carbide matrix composite material according to one embodiment of the present invention.

By applying the press forming, a compact having an appropriate density (powder-filled state) can be obtained. This is effective in controlling the microstructure of the liberated Si phase 5 and the like. FIG. 2 is a sectional view schematically showing the microstructure of the compact described above. A compact 11 is a green compact of SiC powder 12 and carbon powder 13 and has a density of a level capable of impregnating the molten Si. The density of the compact 11 can be adjusted by a molding pressure, a degreasing treatment, or the like.

Here, the compact 11 is determined to have a size larger than a part size (final size) taking a machining allowance into consideration but can be made approximate to the final size because a shrinkage at the time of reaction sintering is small. In other words, the compact 11 can be produced into a near net shape for the final shape. Thus, a machining amount after sintering can be reduced extensively. The specific size of the compact 11 is preferably larger than the final size within a range of 10% or less. This compact 11 has a high effect of reducing the machining cost.

Besides, the size of the compact 11 is desirably adjusted depending on its size and shape. For example, if the compact 11 has a size exceeding 100 mm, the size of the compact 11 is preferably made large within a range of 8% or less of the final size. If the compact 11 has a size exceeding 200 mm, the size of the compact 11 is preferably made large within a range of 5% or less of the final size. It is desirable to approximate the size of the compact 11 to the final size because the machining amount increases as the final size becomes large.

It is assumed here that the size indicates the maximum size of the part. For example, where a part having a diameter of 300 mm and a thickness of 5 mm is produced, the compact is desirably produced so to have a size of 5% or less of the final size in the diameter direction and 10% or less of the final size in the thickness direction. It is also desirable that the other sizes of the compact are determined considering the maximum size in the same way.

The compact 11 is not limited to the same shape as it is press formed but may be adjusted by processing. Specifically, a preliminary compact having a size larger than the final size is produced. The preliminary compact is at least partly processed to produce a compact which is smaller than the preliminary compact but larger than the final size. In the stage of the compact, fabrication can be made easily.

Especially, in a stage of forming a complex shaped portion or the like, even a portion which is hardly shaped can be fabricated with ease if it is a part of the compact. Either of machining and manual processing may be applied to processing of the compact. Where the compact is subjected to processing, a compact calcination step may be conducted in order to improve the strength of the compact. Thus, stable production up to a large and thin structure can be made stably.

Thus, the cost required for a finishing work can be further reduced by fabricating in the stage of the compact to provide a state closer to the final size. The finishing work is preferably conducted to merely modify a size and a shape.

Then, the compact 11 is heated to a temperature of the melting point or more of Si, specifically a temperature of 1400° C. or more, and a molten Si 14 is impregnated in the compact 11 in the heated state. The compact 11 is reaction sintered by the impregnation step of the molten Si 14. For example, the molten Si is impregnated under reduced pressure or in an inert atmosphere. The molten Si is impregnated quickly (on the second time scale) though variable depending on the size of the compact 11, and a reaction between the molten Si and the carbon powder is also made quickly (on the minute time scale).

The carbon powder 13 in the compact 11 contacts to react with the molten Si 14 at a high temperature to produce SiC (second SiC phase 4) having an average crystal grain diameter smaller than that of the SiC 12 in the starting material. The SiC 12 in the starting material does not substantially have grain growth in the reaction step to become the first SiC phase 3. Besides, the interstices of the crystal grains of the SiC phases 3, 4 have Si, which was not involved in the reaction, continuously present as the liberated Si phase 5 in the network form. The SiC matrix composite material (SiC matrix reaction-sintered body) 1 is obtained by the reaction sintering step. The specific structure of the SiC matrix composite material 1 is already described above.

The SiC matrix composite material (SiC matrix reaction-sintered body) 1 is undergone finishing work by machining or the like into a part of the SiC matrix composite material. Here, according to the above-described reaction sintering step having controlled the microstructure, a sintering shrinkage from the compact can be minimized. Specifically, a shrinkage amount at sintering can be limited to within ±3%, and further to within ±1%. It also includes the expansion at the time of solidification of the molten Si. Thus, the cost for fabricating to the final size can be further reduced by extensively reducing the shrinkage amount at the time of sintering. It is desirable that the machining allowance at the finishing work is 100 μm or more considering the precision and the like of the final shape.

As described above, the process for producing the SiC matrix composite material and the process for producing parts of the SiC matrix composite material according to the present invention are applied to give high strength and high toughness to the complex shaped and large silicon carbide matrix composite material and its parts and can reduce substantially the production cost including the fabrication cost and the material cost. In other words, parts of the silicon carbide matrix composite material with high strength and high toughness can be provided inexpensively. The parts here are ordinary parts which are used in plural to constitute a whole and also include a jig, a member or an ornament which is used for attachment to a device or the like.

Typical forms of parts to which the producing process of the present invention is applied include, for example, the following. Specifically, they include a disk-shaped part having a diameter of 300 mm and a thickness of 10 mm as a mirror-finished part, an annular material having an outer diameter of 350 mm, an inner diameter of 300 mm and a thickness of 2 mm as a jig for semiconductor manufacturing devices, a tubular material having an outer diameter of 100 mm, an inner diameter of 80 mm and a height of 60 m as a sliding part, a cylindrical material having a diameter of 60 mm and a height of 60 mm, an annular material having an outer diameter of 200 mm, an inner diameter of 160 mm and a height of 20 mm, and the like. Naturally, the present invention is not limited to the production of the above parts.

The reaction-sintering method controlling the microstructure according to the present invention described above is not limited to the production of the SiC matrix composite material (SiC matrix reaction-sintered body) but also effective in bonding plural SiC matrix composite materials (plural part units). A process for producing a part of the SiC matrix composite material by bonding plural SiC matrix composite materials will be described below. A bonding method applying the reaction sintering is broadly divided into a method (first method) of bonding in a stage of the compact formed of a mixture of SiC and carbon and a method (second method) of bonding a sintered body.

Figure 3:
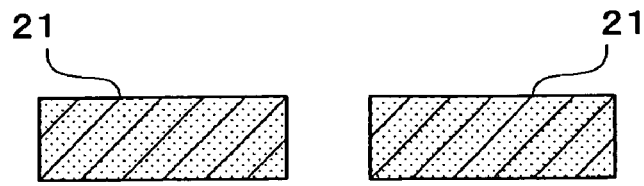
FIG. 3 is a sectional view schematically showing a bonding step which applies a first bonding method of a process for producing a part of a silicon carbide matrix composite material of the present invention.

FIG. 3 to FIG. 6 schematically show the steps of the first method of bonding in the stage of the compact. First, two or more compacts 21 are prepared as shown in FIG. 3. The compacts 21 have the same structure as that of the compact 11 used in the step of producing the SiC matrix composite material described above and are formed of a green compact of SiC powder and carbon powder.

Figure 4:
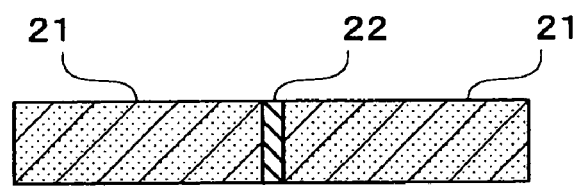
FIG. 4 is a sectional view schematically showing the bonding step following FIG. 3.
Figure 5:
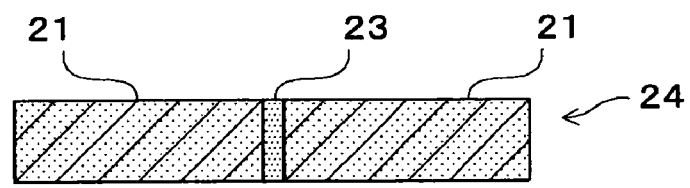
FIG. 5 is a sectional view schematically showing the bonding step following FIG. 4.

Then, the two compacts 21 are bonded by an organic adhesive 22 as shown in FIG. 4. The organic adhesive 22 is not limited to a particular one but can be various types of adhesives if carbon remains after a heat treatment. Then, a heat treatment is conducted to transform the organic adhesive 22 into a porous body 23 having carbon as primary component as shown in FIG. 5. Specifically, a preliminary bonded body 24 which has the two compacts 21 joined by the porous body 23 having carbon as the primary component is produced. It is preferable that the porous body 23 has a porosity in a range of 20 to 70%. After the bonding step, a step of calcinating the plural compacts 21 including the bonded portion of the organic adhesive 22 may be conducted. This step contributes to the improvement of productivity of a large complex-shaped part.

Figure 6:
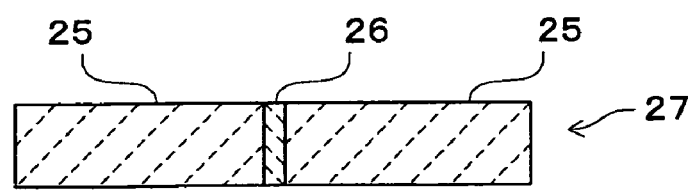
FIG. 6 is a sectional view schematically showing a structural example of a bonded part which applies the first bonding method of the process for producing a part of a silicon carbide matrix composite material of the present invention.

The above-described preliminary bonded body 24 is heated to a temperature of the melting point or more of Si to impregnate the molten Si into the preliminary bonded body 24 in the heated state. The impregnation step of the molten Si is conducted in the same manner as in the above-described process for producing the SiC matrix composite material. In the impregnation step of the molten Si, the two compacts 21 each are reaction sintered, and the porous body 23 of the bonded portion is also reaction sintered. Specifically, a bonded body 27 which has two SiC matrix reaction-sintered bodies 25 integrally bonded by a reaction-sintered bonding layer 26 is obtained as shown in FIG. 6. The two SiC matrix reaction-sintered bodies 25 each configure a part unit.

Figure 7:
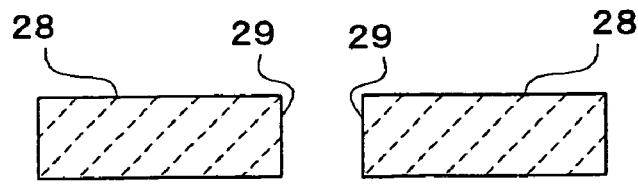
FIG. 7 is a sectional view schematically showing a bonding step which applies a second bonding method of a process for producing a part of a silicon carbide matrix composite material of the present invention.

Then, a second process for bonding the sintered bodies will be described. FIG. 7 to FIG. 10 schematically show steps of the process for producing a part of the SiC matrix composite material to bond the sintered bodies. First, two or more SiC matrix sintered bodies 28 are prepared as shown in FIG. 7. It is preferable that the SiC matrix sintered bodies 28 are produced by applying the above-described process for producing the SiC matrix composite material. The two SiC matrix sintered bodies 28 has Si present on bonded surfaces 29 previously removed by a heat treatment or chemical treatment.

Figure 8:
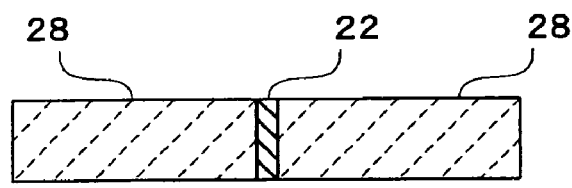
FIG. 8 is a sectional view schematically showing the bonding step following FIG. 7.
Figure 9:
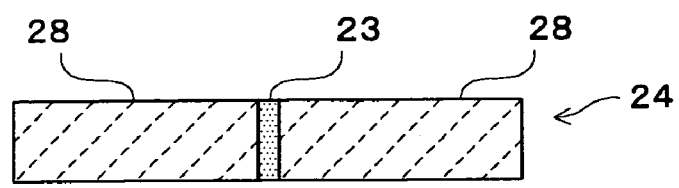
FIG. 9 is a sectional view schematically showing the bonding step following FIG. 8.

Then, the two SiC matrix sintered bodies 28 are adhered by the organic adhesive 22 as shown in FIG. 8. The organic adhesive 22 is transformed into the porous body 23 in the same manner as the first method. Thus, the preliminary bonded body 24 having the two SiC matrix sintered bodies 28 joined by the porous body 23 having carbon as the primary component is produced as shown in FIG. 9. It is preferable that the porous body 23 has a porosity in a range of 20 to 70% in the same manner as the first method.

Figure 10:
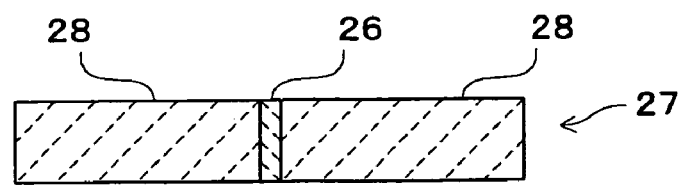
FIG. 10 is a sectional view schematically showing a structural example of a bonded part which applies the second bonding method of the process for producing a part of a silicon carbide matrix composite material of the present invention.

The above-described preliminary bonded body 24 is heated to a temperature of the melting point or more of Si, and the molten Si is impregnated into the preliminary bonded body 24 in the heated state. The molten Si is especially impregnated into the porous body 23. In the impregnation step of the molten Si, the porous body 23 of the bonded portion is reaction sintered. Specifically, the bonded body 27 which has the two SiC matrix reaction-sintered bodies 28 integrally joined by the reaction-sintered bonding layer 26 can be obtained as shown in FIG. 10. The two SiC matrix reaction-sintered bodies 29 each configure a part unit.

Figure 11:
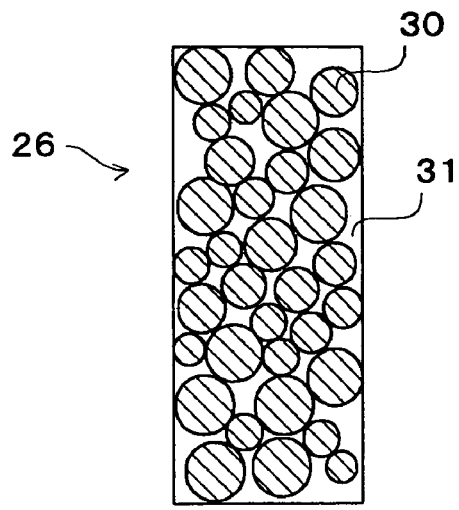
FIG. 11 is an enlarged sectional view schematically showing a microstructure of a bonded layer portion of a bonded part applying the present invention.

The reaction-sintered bonding layer 26 configuring the bonded portion of the bonded body 27 has SiC crystal grains 30 and a liberated Si phase 31 continuously present in network form among the crystal grains as shown in FIG. 11. Therefore, the reaction-sintered bonding layer 26 itself has outstanding strength and a good bonding strength to the SiC matrix reaction-sintered bodies 25, 28, so that the two SiC matrix reaction-sintered bodies 25, 28 can be bonded with an enhanced strength.

The bonded body 27 applying the process for producing according to the present invention has a typical strength of, for example, 150 MPa or more and 1000 MPa or less as bending strength. The reaction-sintered bonding layer 26 has a typical hardness of Hv1200 or more and Hv2200 or less. The reaction-sintered bonding layer 26 has a typical Young's modulus of 300 GPa or more and 420 GPa or less.

It is preferable that the reaction-sintered bonding layer 26 has an average thickness in a range of 1 to 200 μm. The bonding layer 26 having a thickness of less than 1 μm is produced with difficult in the production process, and an inadequately formed portion of the bonding layer 26 becomes a defect, resulting in degrading the reliability and durability of the bonding layer 26 itself. Meanwhile, if the bonding layer 26 has a thickness exceeding 200 μm, the strength of the bonded body 27 is degraded. It is preferable that the SiC crystal grains 28 constituting the reaction-sintered bonding layer 26 has an average crystal grain diameter in a range of 0.1 to 30 μm. The reaction-sintered bonding layer 26 desirably has a porosity of 5% or less. By configuring in this way, the strength and reliability of the reaction-sintered bonding layer 26 can be enhanced.

Figure 12:
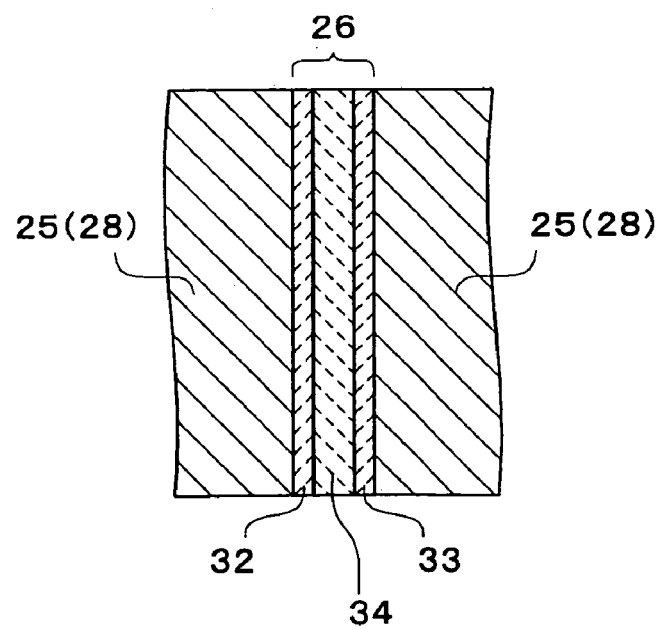
FIG. 12 is a sectional view showing an enlarged image of a bonded layer portion of a bonded part applying the present invention.

Besides, the reaction-sintered bonding layer 26 preferably has a three-layer structure as shown in FIG. 12. The reaction-sintered bonding layer 26 shown in FIG. 12 has layers 32, 33, which are in contact with the individual SiC matrix reaction-sintered bodies (part units) 25, 28, and a layer 34 positioned at the center. The part contact layers 32, 33 have a structure similar to the SiC matrix reaction-sintered bodies (part units) 25, 28 than to the center layer 34.

It is preferable that the part contact layers 32, 33 have a higher content ratio of liberated silicon than the center layer 34. Specifically, it is preferable that the part contact layers 32, 33 have a liberated silicon content ratio 10 to 70% higher than the center layer 34. The center layer 34 preferably has a thickness in a range of 0.5 to 100 μm. The reliability and durability of the bonded body 27 can be enhanced furthermore by adhering the two SiC matrix reaction-sintered bodies (part units) 25, 28 by the reaction-sintered bonding layer 26 having the three layer structure.

By the process for producing the part of the SiC matrix composite material having the first bonding step or second bonding step as described above, the plural SiC matrix reaction-sintered bodies constituting the individual part units can be integrated into one body firmly by the reaction-sintered bonding layer. Therefore, more complex-shaped parts and large parts (structures) can be produced integrally, and the strength of such a structure can be enhanced. It contributes to the reduction of the production cost of complex-shaped parts and large structures and the improvement of the production efficiency.

Then, specific examples and evaluated results of the present invention will be described.

EXAMPLE 1

First, silicon carbide (α-SiC) powder having an average grain diameter of 0.5 μm and carbon powder (carbon black) having an average grain diameter of 0.03 μm were mixed such that their mass ratio was 10:4 (=SiC:C). The mixed powder was mixed with a required amount of an organic binder and dispersed into a solvent to prepare slurry having a low viscosity. Then, a pressure casting machine was used to fill the slurry into a forming die under a pressure of 7 MPa. Thus, a plate-like compact having a prescribed compact density was produced.

Then, the compact was air dried, heated to and held at a temperature of 600° C. in an inert gas atmosphere to remove (degrease) the organic binder. The degreased compact was heated to a temperature of 1400° C. or more under reduced pressure or in an inert gas atmosphere, and molten silicon was impregnated into the compact kept in the heated state. The compact was reaction sintered in the impregnation step of the molten silicon to obtain an SiC matrix sintered body (SiC matrix composite material). The obtained SiC matrix sintered body was polished its surface and undergone evaluation of properties described later.

EXAMPLES 2 AND 3

Compacts were produced in the same manner as in Example 1 except that starting materials (SiC powder and C powder) shown in Table 1 were used and the forming conditions shown in Table 1 were applied. Molten silicon was impregnated into the compacts under the same conditions as those in Example 1 to produce individual SiC matrix sintered bodies (SiC matrix composite materials). The obtained SiC matrix sintered bodies were polished their surfaces and undergone evaluation of properties described later.

EXAMPLE 4

Silicon carbide (β-SiC) powder having an average grain diameter of 0.2 μm and carbon powder (carbon black) having an average grain diameter of 0.01 μm were mixed such that their mass ratio was 10:2 (=SiC:C). Besides, the mixed powder was mixed with a required amount of an organic binder to produce granulated powder. Then, the granulated powder was filled in a forming die and press formed under a pressure of 2 MPa by a press forming machine. Thus, a compact having a prescribed compact density was produced.

Then, the compact was heated and kept at a temperature of 600° C. in an inert gas atmosphere to remove (degrease) the organic binder. The degreased compact was heated to a temperature of 1400° C. or more under reduced pressure or in an inert gas atmosphere, and molten silicon was impregnated into the compact kept in the heated state. The compact was reaction sintered in the molten silicon impregnation step to obtain an SiC matrix sintered body (SiC matrix composite material). The obtained SiC matrix sintered body was polished its surface and undergone evaluation of properties described later.

EXAMPLE 5

A compact was produced in the same manner as in Example 4 except that starting materials (SiC powder and C powder) shown in Table 2 were used and the forming conditions shown in Table 2 were applied. Molten silicon was impregnated into the compact under the same conditions as those in Example 4 to produce an SiC matrix sintered body (SiC matrix composite material). The obtained SiC matrix sintered body was polished its surface and undergone evaluation of properties described later.

EXAMPLES 6 AND 7

Individual compacts were produced in the same manner as in Example 1 except that starting materials (SiC powder and C powder) shown in Table 1 were used and the forming conditions shown in Table 1 were applied. Molten silicon was impregnated into the compacts under the same conditions as those in Example 1 to produce SiC matrix sintered bodies (SiC matrix composite materials). The obtained SiC matrix sintered bodies were polished their surfaces and undergone evaluation of properties described later.

EXAMPLES 8 AND 9

Individual compacts were produced in the same manner as in Example 4 except that starting materials (SiC powder and C powder) shown in Table 2 were used and the forming conditions shown in Table 2 were applied. Molten silicon was impregnated into the compacts under the same conditions as those in Example 4 to produce SiC matrix sintered bodies (SiC matrix composite materials). The obtained SiC matrix sintered bodies were polished their surfaces and undergone evaluation of properties described later.

EXAMPLE 10

A compact was produced in the same manner as in Example 1 except that starting materials (SiC powder and C powder) shown in Table 1 were used and the forming conditions shown in Table 1 were applied. Molten silicon was impregnated into the compact under the same conditions as those in Example 1 to produce an SiC matrix sintered body (SiC matrix composite material). The obtained SiC matrix sintered body was polished its surface and undergone evaluation of properties described later.

EXAMPLE 11

A compact was produced in the same manner as in Example 4 except that starting materials (SiC powder and C powder) shown in Table 2 were used and the forming conditions shown in Table 2 were applied. Molten silicon was impregnated into the compact under the same conditions as those in Example 4 to produce an SiC matrix sintered body (SiC matrix composite material). The obtained SiC matrix sintered body was polished its surface and undergone evaluation of properties described later.

COMPARATIVE EXAMPLE 1

Silicon carbide (α-SiC) powder having an average grain diameter of 30 μm and carbon powder (carbon black) having an average grain diameter of 0.07 μm were mixed such that their mass ratio was 10:1 (=SiC:C). The mixed powder was mixed with a required amount of an organic binder to produce granulated powder. Then, the granulated powder was filled in the forming die and press formed by a press forming machine under a pressure of 0.5 MPa Thus, a compact having a prescribed compact density was produced.

Then, the compact was heated to and held at a temperature of 600° C. in an inert gas atmosphere to remove (degrease) the organic binder. The degreased compact was heated to a temperature of 1400° C. or more under reduced pressure or in an inert gas atmosphere, and molten silicon was impregnated into the compact kept in the heated state. The compact was reaction sintered in the impregnation step of the molten silicon to obtain an SiC matrix sintered body (SiC matrix composite material). The obtained SiC matrix sintered body was polished its surface and undergone evaluation of properties described later.

TABLE 1

| | Compact | | | | | |
|---|---|---|---|---|---|---|
| | Raw material powder | | | | Forming step | |
| | SiC powder | | C powder | | | |
| | Average grain diameter (μm) | Crystal phase | Average grain diameter (μm) | Mixing ratio (SiC:C) | Forming method | Forming pressure (MPa) |
| Example 1 | 0.5 | α | 0.03 | 10:4 | PC | 7 |
| Example 2 | 1 | α | 0.07 | 10:5 | PC | 5 |
| Example 3 | 5 | α | 0.3 | 10:3 | PC | 3 |
| Example 4 | 0.2 | β | 0.01 | 10:3 | PF | 3 |
| Example 5 | 5 | β | 0.5 | 10:3 | PF | 1 |
| Example 6 | 0.1 | α | 0.01 | 10:4 | PC | 2 |
| Example 7 | 1 | α | 0.7 | 10:5 | PC | 4 |
| Example 8 | 5 | β | 1.5 | 10:8 | PF | 2 |
| Example 9 | 0.05 | α | 0.3 | 10:10 | PF | 2 |
| Example 10 | 1 | β | 0.07 | 10:10 | PC | 4 |
| Example 11 | 1 | α | 0.07 | 10:1 | PF | 0.5 |
| CE 1 | 30 | α | 0.07 | 10:1 | PF | 0.5 |

CE1 = Comparative Example 1 PC = Pressure Casting PF = Press Forming

The individual SiC matrix composite materials (SiC matrix reaction-sintered bodies) of Examples 1 to 11 and Comparative Example 1 described above were measured and evaluated for the crystal phases and the average crystal grain diameters of the aggregate SiC phases and the reaction product SiC phases, the contents of the liberated Si phases, the average diameters (average fine pore diameters) of the liberated Si phases, the intergranular areas of the SiC crystal grains and the liberated Si phases. The measured results are shown in Table 2.

For the average crystal grain diameter of the SiC phase, a desired cross section of SiC matrix composite material was mirror finished, an enlarged observation photograph of the texture was taken through an electron microscope, the enlarged observation photograph was subjected to image processing, and the individual SiC crystal grains were measured for a crystal grain diameter. An average crystal grain diameter was calculated from the results of measuring the crystal grain diameters of the SiC crystal grains. The crystal phases of the individual SiC phases were identified by microarea X-ray diffractometry.

A material composition ratio was calculated based on the theoretical density of Si and SiC from the results of image processing of the texture observation photograph and the sintered body density. The intergranular area of the SiC crystal grains and the liberated Si phase was determined by heating the SiC matrix composite material to 1600° C. under reduced pressure to remove Si and measuring a specific surface area by mercury porosimetry. The average value of small pore diameters measured at the same time was determined as an average diameter with the liberated Si phase assumed as a cylinder.

Besides, the individual SiC matrix composite materials of Examples 1 to 11 and Comparative Example 1 were measured for mechanical properties as follows. First, bending test pieces each having a width of 4 mm, a thickness of 3 mm and a length of 40 mm were fabricated from the SiC matrix composite material. The bending test pieces were tested by a three-point bending test (room temperature) under conditions of a span of 30 mm and a head speed of 0.5 mm/min. Then, the fracture toughness values of SiC matrix composite materials were measured by the IF method (indentation fracture method). The measured results are also shown in Table 2.

TABLE 2

| | SiC matrix composite material (reaction-sintered SiC) | | | | | | | |
|---|---|---|---|---|---|---|---|---|
| | SiC phase | | | | | | | |
| | | Reaction product | | Si phase | | | Properties | |
| | Aggregate SiC | | SiC | | | | | Fracture |
| | Average grain diameter (μm) | Crystal phase | Average grain diameter (μm) | Crystal phase | Content (Mass %) | Average diameter (μm) | Intergranular area ($m^2/g$) | Strength (MPa) | toughness value ($MPa/m^{1/2}$) |
| E1 | 0.5 | α | 0.05 | β | 18 | 0.08 | 4.0 | 1200 | 3.6 |
| E2 | 1 | α | 0.1 | β | 12 | 0.1 | 1.0 | 1000 | 3.8 |
| E3 | 5 | α | 0.5 | β | 9 | 1.0 | 0.2 | 800 | 3.7 |
| E4 | 0.2 | β | 0.02 | β | 28 | 0.8 | 2.0 | 900 | 3.2 |
| E5 | 8 | β | 0.8 | β | 24 | 1.5 | 0.3 | 700 | 3.4 |
| E6 | 0.1 | α | 0.02 | β | 19 | 2.0 | 15 | 600 | 2.4 |
| E7 | 1 | α | 1 | β | 14 | 3.0 | 0.2 | 500 | 2.6 |
| E8 | 5 | β | 2 | β | 8 | 5.0 | 0.2 | 400 | 3.0 |
| E9 | 0.05 | α | 0.5 | β | 17 | 3.0 | 0.04 | 450 | 2.4 |
| E10 | 1 | β | 0.1 | β | 4 | 0.1 | 0.2 | 350 | 3.2 |
| E11 | 1 | α | 0.1 | β | 55 | 5.0 | 0.08 | 400 | 2.0 |
| CE1 | 30 | α | 0.1 | β | 45 | 10 | 0.01 | 200 | 1.6 |

E = Example, CE = Comparative Example

The individual SiC matrix composite materials of Examples 1 to 11 each are controlled to have the average crystal grain diameter of the aggregate SiC phase and the reaction product SiC phase fall in a prescribed range. Besides, the liberated Si phase was continuously present in network form, and the SiC matrix composite materials of the individual Examples were dense reaction-sintered bodies having substantially no pore. It is seen that the individual SiC matrix composite materials of Examples 1 to 11 have superior bending strength and fracture toughness values in comparison with those of Comparative Example 1.

In the SiC matrix composite materials of Examples 1 to 11, it is seen from the strength property and the like that the content of the liberated Si phase is in a range of 5 to 50 mass %. Besides, it is preferable that the liberated Si phase is controlled to have an average diameter in a range of 0.03 to 3 μm in order to obtain a bending strength of 500 MPa or more with a good reproducibility. The bending strength and fracture toughness values of the SiC matrix composite material can be improved furthermore by controlling the intergranular area of the SiC crystal grains and the liberated Si phase to a range of 0.1 to 10 $m^2/g$.

EXAMPLE 12

Silicon carbide (α-SiC) powder having an average grain diameter of 1 μm, carbon powder (carbon black) having an average grain diameter of 0.5 μm and an organic binder were mixed to produce granulated powder. Then, the obtained granulated powder was filled into a forming die and press formed by a press-molding machine under a pressure of 5 MPa to produce a cylindrical compact. The compact had a shape with a diameter of 51 mm and a height of 6 mm.

Then, the cylindrical compact was heated to and held at a temperature of 600° C. in an inert gas atmosphere to remove (degrease) the organic binder. The degreased compact was heated to a temperature of 1400° C. or more under reduced pressure or in an inert gas atmosphere, and molten silicon was impregnated into the compact kept in the heated state.

The compact was reaction sintered in the impregnation step of the molten silicon to obtain an SiC matrix sintered body (SiC matrix composite material). A shrinkage rate at the sintering was 0.8%. The obtained SiC matrix sintered body was polished its surface substantially uniformly to produce a cylindrical part having a diameter of 50 mm and a height of 5 mm. The obtained cylindrical part was undergone evaluation of properties described later.

COMPARATIVE EXAMPLE 2

Silicon carbide (α-SiC) powder having an average grain diameter of 0.1 μm, a small amount of a sintering aid and an organic binder were mixed to produce granulated powder. Then, the obtained granulated powder was filled into a forming die and press formed by a press-molding machine under a pressure of 2 MPa to produce a cylindrical compact. The compact had a shape with a diameter of 62 mm and a height of 7 mm.

Then, the cylindrical compact was heated to and held at a temperature of 600° C. in an inert gas atmosphere to remove (degrease) the organic binder. The degreased compact was sintered by heating to a temperature of 1900° C. or more in an inert gas atmosphere. The SiC sintered body was polished its surface substantially uniformly to produce a cylindrical part having a diameter of 50 mm and a height of 5 mm. The cylindrical part was undergone evaluation of properties described later.

EXAMPLE 13

Silicon carbide (α-SiC) powder having an average grain diameter of 1 μm, carbon powder (carbon black) having an average grain diameter of 0.01 μm and an organic binder were mixed, and the obtained mixture was dispersed into a solvent to prepare slurry having a low viscosity. Then, a pressure casting machine was used to fill the slurry into a forming die under a pressure of 3 MPa. Thus, a plate-like compact having a width of 210 mm, a length of 310 mm and a thickness of 7 mm was produced.

Then, the compact was air dried and heated to and held at a temperature of 600° C. in an inert gas atmosphere to remove the organic binder. The degreased compact was heated to a temperature of 1400° C. or more under reduced pressure or in an inert gas atmosphere, and molten silicon was impregnated into the compact kept in the heated state.

The compact was reaction sintered in the impregnation step of the molten silicon to obtain an SiC matrix sintered body (SiC matrix composite material). A shrinkage rate at the sintering was 0.5%. The obtained SiC matrix sintered body was polished its surface substantially uniformly to produce a plate-like part having a width of 200 mm, a length of 300 mm and a thickness of 5 mm. The obtained plate-like part was undergone evaluation of properties described later.

COMPARATIVE EXAMPLE 3

Silicon carbide (α-SiC) powder having an average grain diameter of 0.1 μm, a small amount of a sintering aid and an organic binder were mixed to produce granulated powder. Then, the obtained granulated powder was filled into a forming die and press formed by a press-molding machine under a pressure of 1.5 MPa to produce a plate-like compact. The compact had a shape with a width of 250 mm, a length of 360 mm and a thickness of 10 mm.

Then, the plate-like compact was heated to and held at a temperature of 600° C. in an inert gas atmosphere to remove (degrease) the organic binder. The degreased compact was sintered by heating to a temperature of 1900° C. or more in an inert gas atmosphere. The SiC sintered body was polished its surface substantially uniformly to produce a plate-like part having a width of 200 mm, a length of 300 mm and a thickness of 5 mm. The plate-like part was undergone evaluation of properties described later.

The individual parts (parts of the SiC matrix composite materials) of Examples 12 and 13 and Comparative Examples 2 and 3 were measured for a three-point bending strength in the same manner as in Example 1. Besides, the part production cost by Example 12, the part production cost by Comparative Example 2, the part production cost by Example 13 and the part production cost by Comparative Example 3 were compared. The results are shown in Table 3. The compared cost results each are relative values with Comparative Examples assumed as 100.

TABLE 3

| Part | Part material | Compact size | Part size | Bending strength (Mpa) | Cost |
|---|---|---|---|---|---|
| E12 | SiC matrix reaction-sintered body | Diameter of 51 mm × 6 mm | Diameter of 50 mm × 5 mm | 1100 | 70 |
| CE2 | SiC matrix atmospheric sintered body | Diameter of 62 mm × 7 mm | Diameter of 50 mm × 5 mm | 400 | 100 |
| E13 | SiC matrix reaction-sintered body | 210 mm × 310 mm × 7 mm | 200 mm × 300 mm × 5 mm | 900 | 50 |
| CE3 | SiC matrix atmospheric sintered body | 250 mm × 360 mm × 10 mm | 200 mm × 300 mm × 5 mm | 300 | 100 |

E = Example CE = Comparative Example

It is apparent from Table 3 that the parts according to Example 12 and Example 13 can be produced at a cost lower than in Comparative Examples and are superior in mechanical properties such as bending strength. This greatly contributes to expansion of applicability of the SiC matrix reaction-sintered body.

EXAMPLE 14

Silicon carbide (α-SiC) powder having an average grain diameter of 0.5 μm and carbon powder (carbon black) having an average grain diameter of 0.01 μm were mixed such that their mass ratio was 10:3 (=SiC:C). Besides, the mixed powder was mixed with a required amount of an organic binder and dispersed into a solvent to prepare slurry having a low viscosity. Then, a pressure casting machine was used to fill the slurry into a forming die under a pressure of 1 MPa. Thus, two plate-like compacts each having a prescribed compact density were produced.

Then, the two plate-like compacts were air dried and bonded by an organic adhesive. The bonded body was heated to and held at a temperature of 500° C. in an inert gas atmosphere to change the organic adhesive to a porous body having carbon as a primary component. The preliminary bonded body which had the two plate-like compacts joined by the porous body was heated to a temperature of 1400° C. or more under reduced pressure or in an inert gas atmosphere, and molten silicon was impregnated into the compact and the bonding layer kept in the heated state.

In the molten silicon impregnation step, the two plate-like compacts were reaction sintered into SiC matrix reaction-sintered bodies to obtain a bonded part which had the two SiC matrix reaction-sintered bodies joined by the SiC matrix reaction-sintered body (bonding layer). It was confirmed that the reaction-sintered bonding layer had a thickness of about 40 μm and a three layer structure of a layer in contact with the individual SiC matrix reaction-sintered bodies and the center layer. Besides, the SiC phase in the reaction-sintered bonding layer had an average crystal grain diameter of 2 μm, a porosity of 0.2% and a silicon content of 25 mass %.

Mechanical properties of the bonded part were measured as follows. First, a bending test piece having a width of 4 mm, a thickness of 3 mm and a length of 40 mm was fabricated from the bonded part. At that time, it was determined that the bonded surface was perpendicular to the longitudinal direction of the test piece and the bonding layer was located at the center of the test piece. The bending test piece was used to conduct a three-point bending test (room temperature) under conditions of a span of 30 mm and a head speed of 0.5 mm/min. Young's modulus was calculated from a net displacement amount of a load point of the three-point bending test. Hardness of the bonding layer portion was measured by the Vickers method. As a result, a bending strength was 700 MPa, a Young's modulus was 390 GPa and a Vickers hardness was Hv1800.

EXAMPLE 15

Silicon carbide (α-SiC) powder having an average grain diameter of 0.2 μm and carbon powder (carbon black) having an average grain diameter of 0.01 μm were mixed such that their mass ratio was 10:2 (=SiC:C). Besides, the mixed powder was mixed with a required amount of an organic binder to produce granulated powder. Then, the granulated powder was filled into a forming die and press formed by a press forming machine under a pressure of 2 MPa. Thus, two compacts were produced.

Then, the two compacts were heated to and kept at a temperature of 600° C. in an inert gas atmosphere to remove (degrease) the organic binder. The degreased compacts were heated to a temperature of 1400° C. or more under reduced pressure or in an inert gas atmosphere, and molten silicon was impregnated into the compacts kept in the heated state. The compacts were reaction sintered in the molten silicon impregnation step to obtain two SiC matrix reaction-sintered bodies.

The bonded surfaces of the obtained two SiC matrix reaction-sintered bodies were undergone an acid (hydrofluoric acid+nitric acid) treatment to remove Si from the bonded surfaces. The bonded surfaces of the two SiC matrix reaction-sintered bodies were joined by an organic adhesive. The bonded body was heated to and held at a temperature of 500° C. in an inert gas atmosphere to change the organic adhesive to a porous body having carbon as a primary component. The preliminary bonded body which had the two SiC matrix reaction-sintered bodies joined by the porous body was heated to a temperature of 1400° C. or more under reduced pressure or in an inert gas atmosphere, and molten silicon was impregnated into the compact kept in the heated state.

In the molten silicon impregnation step, the bonded part, which had the two SiC matrix reaction-sintered bodies joined by the reaction-sintered bonding layer, was obtained. It was confirmed that the reaction-sintered bonding layer was configured of the SiC phase, which was produced by a reaction of carbon of the porous body derived from the organic adhesive and the molten Si, and the Si phase continuously present in network form in its grain boundary.

It was confirmed that the reaction-sintered bonding layer had a thickness of about 80 μm and a three layer structure of a layer in contact with the individual SiC matrix reaction-sintered bodies and the center layer. The SiC phase of the reaction-sintered bonding layer had an average crystal grain diameter of 5 μm, a porosity of 0.8% and a silicon content of 40 mass %. The mechanical properties of the bonded part were measured in the same manner as in Example 14 to find that it had a bending strength of 500 MPa, Young's modulus of 340 GPa and Vickers hardness of Hv1600.

INDUSTRIAL APPLICABILITY

It is apparent from the above-described embodiments that the silicon carbide matrix composite material of the present invention has superior strength, fracture toughness value, and the like because the microstructure of the silicon carbide crystal grains such as the crystal grain diameter is controlled. Accordingly, a low-cost silicon carbide matrix composite material can be applied to parts, equipment and the like which are required to have high strength and the like. According to the producing process of the present invention, the silicon carbide matrix composite material having high strength and high toughness and parts of the composite material can be provided inexpensively.

What is claimed is:

1. A silicon carbide matrix composite material, comprising:
    a silicon carbide matrix which comprises a first silicon carbide phase having silicon carbide crystal grains with an average crystal grain diameter in a range of 0.1 to 10 μm and a second silicon carbide phase having silicon carbide crystal grains with an average crystal grain diameter in a range of 0.01 to 2 μm; and
    a silicon phase which is continuously present in network form in interstices of the silicon carbide crystal grains constituting the silicon carbide matrix, and has an average diameter in a range of 0.03 to 3 μm.
    wherein the composite material contains the silicon phase in a range of 5 to 50 mass %.

2. The silicon carbide matrix composite material according to claim 1, wherein the an intergranular area of the silicon carbide crystal grains constituting the silicon carbide matrix and the silicon phase is in a range of 0.1 to 10 m²/g.

3. The silicon carbide matrix composite material according to claim 1, wherein the first silicon carbide phase comprises silicon carbide blended as aggregate, the second silicon carbide phase comprises silicon carbide produced by a reaction of carbon and silicon, and the first silicon carbide phase has an average crystal grain diameter larger than that of the second silicon carbide phase.

4. The silicon carbide matrix composite material according to claim 1, wherein the first silicon carbide phase comprises an α phase or a β phase, the second silicon carbide phase comprises a β phase, and the first silicon carbide phase has an average crystal grain diameter larger than that of the second silicon carbide phase.

5. The silicon carbide matrix composite material according to claim 1, wherein the silicon carbide matrix composite material has a bending strength of 500 MPa or more.

6. The silicon carbide matrix composite material according to claim 1,
    wherein the average crystal grain diameter of the silicon carbide crystal grains in the first silicon carbide phase is in a range of 0.1 to 5 μm.

7. The silicon carbide matrix composite material according to claim 1,
    wherein the average crystal grain diameter of the silicon carbide crystal grains in the second silicon carbide phase is in a range of 0.02 to 1 μm.

8. The silicon carbide matrix composite material according to claim 1,
    wherein the content of the silicon phase in the composite material is in a range of 5 to 30 mass %.

9. The silicon carbide matrix composite material according to claim 1,
wherein the composite material is formed by impregnating molten silicon into a compact of a mixed powder of silicon carbide powder and carbon powder, and a mass ratio of the silicon carbide powder and the carbon powder in the compact is in a range of 10:1 to 10:10.

10. The silicon carbide matrix composite material according to claim 9,
wherein the mass ratio of the silicon carbide powder and the carbon powder in the compact is in a range of 10:3 to 10:5.

* * * * *